United States Patent Office 2,779,799
Patented Jan. 29, 1957

---

2,779,799

1-CYCLOBUTYL-1-ETHYNYL-ETHANOL-1

Kenneth E. Hamlin, Jr., Lake Bluff, Ill., assignor to Abbott Laboratories, North Chicago, Ill., a corporation of Illinois No Drawing. Application May 12, 1953,
Serial No. 354,627

1 Claim. (Cl. 260—617)

This application pertains to a new class of hypnotic drugs and more particularly to a new class of acetylenic carbinols characterized by hypnotic activity. The invention further pertains to a method for making such new pharmaceutical compounds and to pharmaceutical preparations containing such compounds.

Certain acetylenic alcohols are known to have hypnotic activity but the degree of hypnosis obtained from known acetylenic alcohols is either too slight or unpredictable to be of great practical value. The need for a non-barbiturate hypnotic is conceded in the art because of certain side effects which are attendant with the hypnotic activity of the barbiturates.

It is an object of this invention, therefore, to provide a hypnotic compound which is substantially devoid of undesirable side effects but which will provide hypnotic activity of a strong and reproducible character.

It is a further object of the invention to provide a method for making hypnotic acetylenic carbinols by a process which will provide high yields of pure product.

It is another object of the invention to provide new pharmaceutical preparations incorporating the hypnotic compounds previously referred to in a form which will render their application simple and effective.

In the accomplishment of the foregoing objects and in accordance with the practice of the invention there is now provided a new hypnotic drug 1-cyclobutyl-1-ethynyl-ethanol-1 characterized by a strong hypnotic activity of relatively long duration.

In order to disclose the invention more fully, but without intending to limit the invention in any way, the following example is presented.

EXAMPLE

*1-cyclobutyl-1-ethynyl-ethanol-1*

In the preparation of the above identified compound approximately 1200 cc. of liquid ammonia is placed in a two liter, three necked, round bottom flask fitted with a gas inlet tube and a stirrer. The liquid ammonia is cooled by means of a dry ice-acetone bath to minimize the loss of ammonia during the formation of sodium acetylide. A rapid stream of acetylene is passed into the ammonia and small pieces of metallic sodium are added as rapidly as possible to the mixture. After all of the sodium has been added and after the blue color of the dissolved sodium has disappeared, the flow of acetylene is slowed. The cooling bath is removed and cyclobutyl-methylketone is added dropwise and rapidly through the open neck of the flash. The flow of acetylene is continued for about 1½ hours after all of the ketone has been added. Then the gas inlet tube is removed and about 107 g. (2 mols.) of ammonium chloride is cautiously added to the stirred solution. 100 cc. of water is added and the ammonia is allowed to evaporate. The liquid residue is extracted well with ether, and the several ether extracts are combined and dried over anhydrous magnesium sulfate. The excess ether is removed by distillation at atmospheric pressure and the oil residue is distilled at reduced pressure. 44.3 g. of 1-cyclobutyl-1-ethynyl-ethanol-1 was collected at a distillation temperature of 96–97° C. (at 68–69 mm.). This fraction represented the material having a refractive index $n_D^{25.5}$ of 1.4619–1.4628.

The forerun from the above distilation is redistilled at atmospheric pressure. The fraction distilling at 161–162.5° C. and having a refractive index $n_D^{25.5}$ of 1.4620–1.4630 is the desired 1-cyclobutyl-1-ethynyl-ethanol-1. The yield was 43.2 g. The two fractions previously collected were combined and the analysis for carbon and hydrogen was obtained. The calculated analysis for the formula $C_8H_{12}O$ is C=77.37%; H=9.74%. The actual anaylsis was C=77.49%; H=9.65%.

This compound was found to have high activity as a hypnotic and was found to have a relatively low toxicity with little or no after effect.

Since the compound of this invention is a relatively high boiling liquid it is more desirable to administer it in liquid form. This can be accomplished by enclosing it in a capsule, providing certain steps are taken to render the carbinol non-reactive with the capsule. This can be done by incorporating peanut oil, sesame oil, corn oil or other edible vegetable oils with the carbinol. It is possible also to incorporate the carbinol into solutions, elixers and emulsions.

The liquid carbinol can be absorbed on inert absorbents such as diatomaceous earth and magnesium oxide and these materials can be pressed into tablets which will retain the carbinol if suitably coated with an impervious, non-toxic coating, of the type well known in the tableting art. The carbinol may also be embodied in suppositories by incorporating the carbinol in a suppository base material such as a mixture of the solid polyethylene glycol compounds (carbowaxes) or in a mixture of white wax and cocoa butter. It is also possible to form solutions of the carbinol which are suitable for intraparitoneal administration.

From the foregoing disclosure of the invention numerous other embodiments will be suggested to those skilled in the art. It is contempleted that these embodiments are to be included in the invention provided they fall within the scope of the appended claim.

I claim:

1-cyclobutyl-1-ethynyl-ethanol-1.

References Cited in the file of this patent

FOREIGN PATENTS 505,421    Belgium _____ Sept. 15, 1951

OTHER REFERENCES

Golovchanskaya: Chem. Abstracts, vol. 35 (1941). (Patent Office Libr.)

Bock: Zur Pharmakologie ungesättigter Alkohole (Thesis of the University of Breslau, 1930), pp. 1 to 12.

Margolin: Science, vol. 114, October 1951, pp. 384, 385. (Copy in Sci. Libr.)

Papa: Archives of Biochemistry and Biophysics, vol. 33, October 1951, pp. 482, 483. (Copy in Sci. Libr.)